United States Patent
Nonoyama et al.

(10) Patent No.: US 6,715,033 B2
(45) Date of Patent: *Mar. 30, 2004

(54) METHOD OF AND APPARATUS FOR TRACKING APPENDED DATA ON STORAGE MEDIUM

(75) Inventors: Hideki Nonoyama, Tokyo (JP); Tomonao Uchida, Tokyo (JP); Robert Alan Williams, Bristol (GB); Nigel Kevin Rushton, Bristol (GB); Mark Robert Watkins, Bristol (GB)

(73) Assignees: Hewlett-Packard Development Company, L.C., Houston, TX (US); Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/274,104

(22) Filed: Oct. 21, 2002

(65) Prior Publication Data

US 2003/0088731 A1 May 8, 2003

Related U.S. Application Data

(63) Continuation of application No. 09/647,507, filed on Mar. 6, 2001, now Pat. No. 6,526,482.

(51) Int. Cl.[7] .............................................. G06F 12/02
(52) U.S. Cl. ........................ 711/112; 711/154; 711/155; 711/156; 360/50; 360/72.1; 369/47.1
(58) Field of Search ................................. 711/112, 154, 711/156, 165, 202, 155; 360/50, 72.1; 369/47.1, 47.21, 47.22

(56) References Cited

U.S. PATENT DOCUMENTS

| | | | |
|---|---|---|---|
| 5,373,401 A | 12/1994 | Bentley et al. | 360/50 |
| 5,475,542 A | 12/1995 | Bentley et al. | 360/74.1 |
| 5,550,684 A * | 8/1996 | Shih et al. | 360/48 |
| 5,860,124 A | 1/1999 | Matthews et al. | 711/165 |
| 6,101,158 A | 8/2000 | Hogan | 369/47.1 |
| 6,105,103 A * | 8/2000 | Courtright et al. | 711/1 |
| 6,154,817 A | 11/2000 | Mohan | 711/162 |
| 6,339,810 B1 | 1/2002 | Basham et al. | 711/111 |
| 6,493,273 B2 * | 12/2002 | Katayama et al. | 365/189.05 |
| 6,499,039 B1 * | 12/2002 | Venkatesh et al. | 707/204 |
| 6,526,482 B1 * | 2/2003 | Nonoyama et al. | 711/154 |
| 6,571,205 B1 * | 5/2003 | Doucet et al. | 703/24 |

FOREIGN PATENT DOCUMENTS

| | | |
|---|---|---|
| EP | 0 459 041 | 12/1991 |
| WO | WO95/22826 | 8/1995 |

OTHER PUBLICATIONS

Standard EDMA–236: "3, 81 mm Wide Magnetic Tape Cartridge for Information Interchange—Helical Scan Recording—DDS-3 Format using 125 m Length Tapes," Jun. 1996, pp. 66–67, Geneva CH.

Patent Abstract of Japan, vol. 015, No. 136 (P–1187), Apr. 4, 1991 and JP 03 016077, Jan. 24, 1991.

Anonymous: "Self–Configuration Tape Driver for Emulated and Non–Emulated Tapemarks" IBM Technical Disclosure Bulletin, vol. 39, No. 3. Mar. 1996, pp. 359–360.

Anonymous: "Dynamic Erase Record Gap Length Determination Using Block Read–While–Write Status" IBM Technical Disclosure Bulletin, vol. 38, No. 11, Nov. 1995, pp. 145–148.

* cited by examiner

*Primary Examiner*—T. Nguyen

(57) ABSTRACT

A sequence of data blocks written onto a medium of a data storage system includes first and subsequent appended data blocks having an append point code for identifying the first appended data block location. For data blocks having a running block number or frame number, the block or frame number of the first appended data block is stored as the append point code. The appended point code identifies the most recently append point location and aids in processes, such as tracking calibration, data integrity confirmation and track positioning.

16 Claims, 3 Drawing Sheets

METHOD OF AND APPARATUS FOR TRACKING APPENDED DATA ON STORAGE MEDIUM

This is a continuation of application Ser. No. 09/647,507 filed Mar. 6, 2001, now U.S. Pat. No. 6,526,482.

FIELD OF THE INVENTION

This invention relates to data storage apparatus and methods and in particular, but not exclusively, to such apparatus and methods in which a data group or record may be appended to an earlier written group or record.

BACKGROUND OF THE INVENTION

Data may typically be written onto a storage medium, such as magnetic or magneto-optic media in the form of a sequence of data blocks identified by a unique block identifier. A varying number of these data blocks may be grouped together to form a data group or other group that may be used to designate certain areas of the medium, e.g. End Of Data. The data group is typically the smallest entity that can be written to this medium and contains user data.

The operation of adding new data groups to a medium which already has existing data groups written upon it is referred to herein as "appending". In addition data groups may be written over previously written data with the result that there may be a boundary at one or both ends of the newly written data between previously written and the newly written data. For convenience such newly written data is also referred to herein as "appended".

The conditions during the appending operation may differ from those prevailing during the original writing, operation; thus the recording apparatus may be different, the position, orientation etc. of the write head or heads may be slightly different, the magnetic medium transport mechanism may be slightly different, and so certain characteristics of the appended data (e.g. physical, logical, positional, electrical, etc) may differ from those of the previously written data. In some cases, the reading apparatus may be tolerant of such differences, and these effects may be immaterial. However many types of data storage and retrieval equipment are run at the edge of the performance envelope to maximise storage capacity and storage speed, and so apparently slight changes in such characteristics can cause tremendous problems. For example, in a high speed helical scan tape drive, it is important to be able to determine the average track height, i.e the average height of the track relative to the lower edge of the tape, so that the appropriate read head starts reading at the correct position. It is often necessary in such drives to re-calibrate the track height for the appended data, because the track height for the original data will not be the same as for the appended data. There are of course other characteristics which may change in the appended data and for which new parameters need to be determined. Accordingly during reading, it is usually necessary to stop the tape at each boundary between original and appended data and to reverse it to before the transition or boundary and traverse the boundary region slowly to locate the boundary and then to re-calibrate to obtain the new parameters. Such a procedure is time-consuming and diminishes the performance of the drive.

An example of a typical standard for storing data is described in Standard ECMA-236 "3.81 mm wide Magnetic Tape Cartridge for Information Interchange-Helical Scan Recording—DDS-3 format using 125 m length Tapes" which sets out the recording method and recorded format of a typical modern helical scan tape storage system known as Digital Data Storage (DDS), the entire contents of which are incorporated herein by reference.

In a DDS read/write mechanism using the format defined in that Standard, data are recorded on an elongate recording media, comprising tape coated with a magnetic medium, by a rotating drum carrying one or more electromagnetic heads. The tape is moved by a motor-driven capstan along a path extending between two spools or reels and wrapped partially around the drum. The plane of rotation of the drum is disposed at an angle to the plane of movement of the tape, so that each head traverses the tape along successive tracks extending across the width of the tape at an angle to its centreline. The mechanism includes appropriate circuitry for encoding data into signals suitable for recording on tape, including error detection and correction codes, and for conditioning those signals into a form which is optimally matched to the characteristics of the recording media. For data retrieval, additional circuitry is provided for detecting magnetic field variations stored on the tape, deriving corresponding signals, conditioning those signals into a form suitable for subsequent processing, decoding the encoded data, and detecting and correcting errors.

In both DDS and other types of data storage there is thus a need for a storage apparatus and method which allow the transition or the boundary between previously written and appended data to be precisely located. Accurate determination of this boundary allows considerable improvements in performance when reading a medium containing appended data. Not only does it allow the medium to be moved accurately to the position corresponding to the boundary with minimal overrun, e.g. to allow parameters such as the average track height to be calibrated for the appended data, but following determination of the new parameters, the control system may use the fact that the location of the append point can be accurately determined, to synchronise changing the parameters with the end of the previously written data. Furthermore, those skilled in the art will appreciate that the ability readily to identify whether the data is appended or not, and if so the precise location of the append point will be extremely useful in other processes which monitor or assess the data being read back, e.g. monitoring the continuity thereof, and distinguishing 'old' data.

SUMMARY OF THE INVENTION

Accordingly, in one aspect this invention provides a method of storing data on a storage medium which comprises:

assembling said data into one or more groups each comprising one or more data blocks;

determining whether said one or more groups of data blocks are to be appended to previously written data on said medium;

including in at least some of any appended data blocks of said groups a block order code indicating the order of said data block relative to the remainder thereof;

incorporating in the or each group of appended data blocks an append point code identifying the order of the first appended data block, and storing said one or more groups on said storage medium, whereby the location of the boundary between previously written data and the appended data may be determined subsequently by extracting the append point code from one or more of said appended data blocks.

Although it would be possible to include the block order code in the appended blocks only, the block order code may often be required for other processing routines, and so the block order code is preferably included in both appended and non-appended data blocks.

Although the invention is broadly applicable to a wide range of data storage appliances, it is particularly applicable to devices wherein said data is written by relative movement of a write head and the storage medium. In this instance said method preferably further includes determining the location of the boundary between the previously written data and the appended data as set out above and using said determination to position one or more of the read, write and erase head physically adjacent said boundary.

In another aspect, this invention provides apparatus for storing a stream of data on a storage medium, which comprises:— data assembly means for assembling said data into one or more groups each comprising one or more data blocks for being written onto said storage medium;

appendency determining means for determining whether said data is to be appended to data previously written on said medium;

block ordering means for including in at least some of those data blocks comprising appended data a block order code indicating the order of said data block relative to the remainder thereof;

means for incorporating in the or each group of the appended data blocks an append point code identifying the block order code of the first appended data block;

means for writing said data blocks in series on said storage medium, and append point determining means operable on reading appended data, to determine the location of the boundary between the appended and previously written data by reference to the append point code from one of said appended data blocks.

In another aspect, this invention provides apparatus for reading a stream of data from a storage medium on which is stored one or more earlier groups of one or more data blocks and at least one appended group of one or more data blocks, wherein at least some of the data blocks of said at least one appended group each include a block order code identifying the order of said data block relative to the remainder thereof, and an append point code identifying the block order code of the first appended data block;

said apparatus including read means for reading said appended data blocks from said storage medium, and processing means for extracting the respective append point code from an appended data block, to determine the location of the boundary between the previously written data and the appended data.

Preferably said read means comprises a read head relatively movable with respect to said storage medium, and said apparatus further includes storage medium drive means responsive to said processing means to locate said read head adjacent said boundary.

The apparatus preferably also includes calibration means for calibrating the signal received by said read means, said calibration means being responsive to determination of the boundary identified by said processing means to initiate or invoke a fresh calibration routine.

In yet a further aspect there is provided a method for monitoring data written in accordance with the method defined above, which comprises reading said data, monitoring the append point codes of successive blocks and generating an old data alert if the append point code in a block indicates an append point which precedes that indicated by the append point of a preceding data block.

Whilst the invention has been described above, it extends to any inventive combination of features set out above or in the following description.

BRIEF DESCRIPTION OF THE DRAWINGS

An embodiment of the invention will now be described by way of example only, reference being made to the accompanying drawings in which:—

DETAILED DESCRIPTION OF PREFERRED EMBODIMENT

The embodiment of tape storage and retrieval apparatus described below is based on the DDS 3 Standard defined in Standard ECMA 236. Initially the main components of a DDS 3 tape storage and retrieval apparatus will be described and thereafter the modifications thereof which implement an embodiment of this invention will be described.

Figure 1:
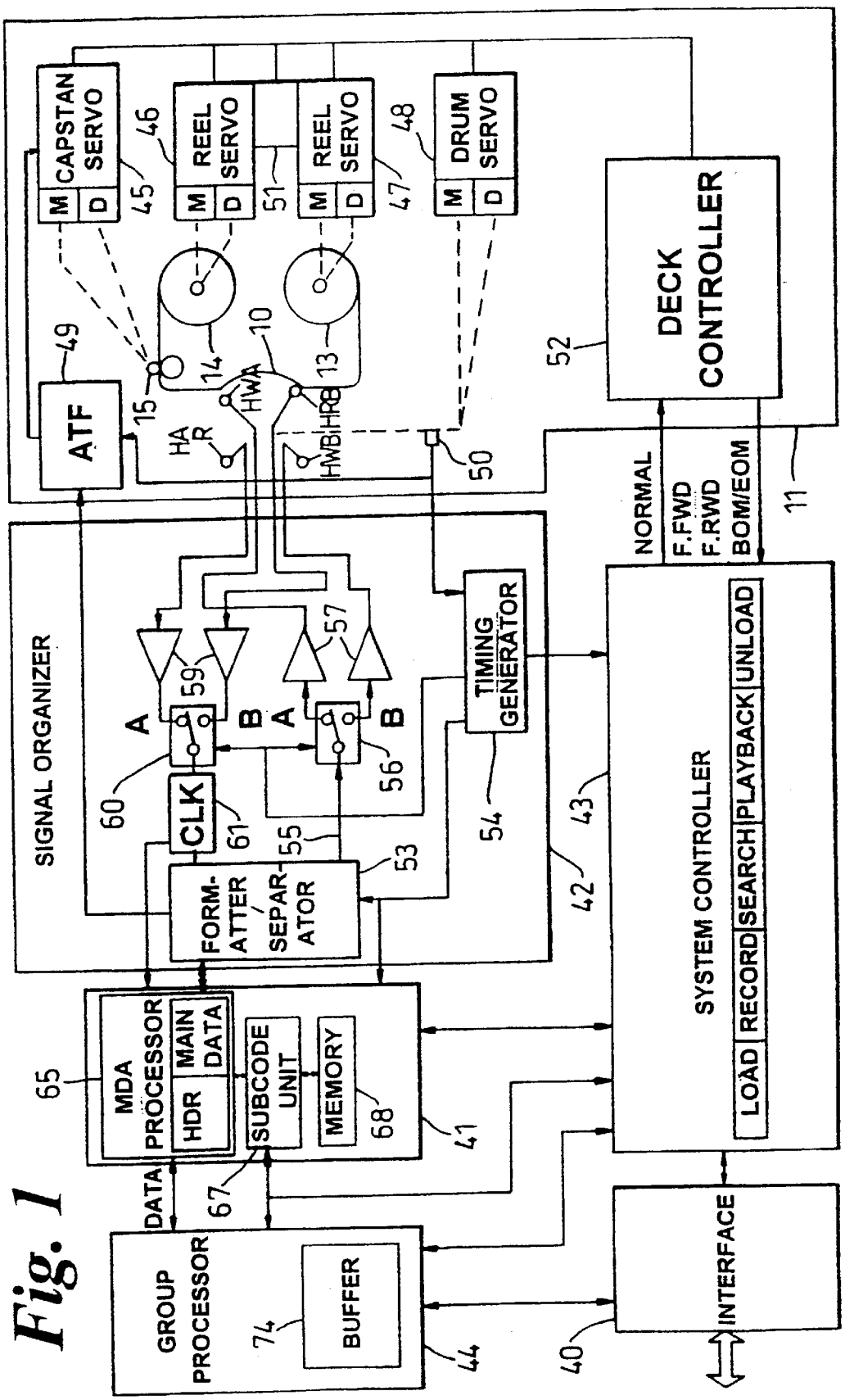
FIG. 1 is a block diagram of the main components of a data storage and retrieval apparatus.

Referring to FIG. 1, the tape storage and retrieval apparatus utilizes a helical scan technique for storing data in oblique tracks on a recording tape in a format similar to that used for the storage of PCM audio data according to the DAT Conference Standard (June 1987 Electronic Industries Association of Japan, Tokyo, Japan). The present apparatus is, however, adapted for storing computer data rather than digitized audio information. The apparatus includes a helical-scan tape deck 11 in which tape 10 passes at a predetermined angle across a rotary head drum (not shown) with a wrap angle of approximately 90°. In operation, the tape 10 is moved from a supply reel 13 to a take-up reel 14 by rotation of a capstan 15 against which the tape is pressed by a pinch roller; at the same time, the head drum is rotated. The head drum houses two diametrically opposed read heads $H_RA$, $H_RB$ and two diametrically opposed write heads $H_WA$, $H_WB$, offset by 90°. In known manner, these heads $H_WA$, $H_WB$ are arranged to write overlapping oblique tracks across the tape 10. The track written by $H_WA$ has a positive azimuth while that written by head $H_WB$ has a negative azimuth; each pair of positive and negative azimuth tracks constitutes a frame. The tracks are used to store data provided to the apparatus (main data), together with items of auxiliary information known as sub-codes, which will be described in more detail below. The tracks also contain synchronization bytes ('sync bytes') to enable data byte boundaries to be identified, and which are used to generate timing signals for controlling tape movement relative to the heads $H_WA$, $HB_W$, $H_RA$ and $H_RB$. Pre-amble blocks included in the tracks contain timing data patterns to facilitate timing synchronization on playback. In addition to the tape deck 11, the apparatus includes an interface unit 40 for interfacing the apparatus with a computer (not shown); a group processor 44 and a frame data processor 41 for processing main data and sub-codes into and out of a Main Data Fragment; a signal organizer 42 for composing/decomposing the signals for writing/reading a track and for appropriately switching the four heads $H_WA$, $H_WB$, $H_RA$ and $H_RB$ and a system controller 43 for controlling the operation of the apparatus in response to commands received from a computer via the interface unit 40. Each of the main component units of the apparatus will be further described below.

The data storage and retrieval apparatus is arranged to respond to commands from a computer to load/unload a tape, to store a data record and other logical segmentation marks, to search for a selected record using the segmentation marks, and the read back the next record.

The interface unit 40 is arranged to receive the commands from the computer and to manage the transfer of data records and logical data segmentation marks between the apparatus and computer. Upon receiving a command from the computer, the unit 40 passes it on to the system controller 43 which, in due course will send a response back to the computer via the unit 40 indicating compliance or otherwise with the original command. Once the apparatus has been set up by the system controller 43 in response to a command from the computer to store or read data, then the interface unit 40 will also control the passage of records and segmentation marks between the computer and the group processor 44.

During data storage the group processor 44 is arranged to segment the data provided to it in the form of data records into data packages (referred to as groups) each containing an amount of data (384, 296 bytes in DDS 3) corresponding to a fixed number of frames (for example, twenty-two plus an optional twenty-third frame if a third level of error correction C3 is employed), with an index which holds information regarding the logical segmentation of the data (record divisions, file marks) which is generated by the processor 44. Each frame comprises two tracks. The processor 44 also generates certain sub-codes whose contents are group-dependent or concern the logical segmentation of data To facilitate these tasks and the transfer of data to and from the processor 44, the latter is provided with a large buffer 74 which is arranged to hold several (for example, three) group's worth of data. Once a group, including its index, has been assembled, it is transferred a frame at a time to the frame data processor 41. In order to speed the transfer of data between the processors 44 and 41, it is advantageous for the frame data processor 41 to be managed in terms of groups for receiving data from the processor 44—in other words, during recording, the processor 41 is told by the group processor 44 when a group is ready for processing after which the processor 41 accesses the frames of the group autonomously from the buffer 74.

When data are being read from tape, the group processor 44 is arranged to receive main data on a frame-by-frame basis, the data being written into the buffer 74 in such a manner as to build up a group. The group processor 44 can then access the group index to recover information on the logical organization (record structure, file marks) of the main data in the group. Using this information the group processor can pass the requested record or segmentation mark to the computer via the interface unit 40.

The frame data processor 41 functionally comprises a Main-Data-Area (MDA) processor 65 and a sub-code unit 67 with an associated electronic memory 68 for tape usage data (in practice, these functional elements may be constituted by a single microprocessor running appropriate processes under program control).

The sub-code unit 67 is arranged to provide sub-codes to the processor 65 as required during recording and to receive and distribute sub-codes from the processor 65 during playback. Dependent on their information contents, sub-codes may be generated/required by the group processor 44 or the system controller. In the case of non-varying sub-codes such as certain recording parameters, the sub-codes may be permanently stored in the unit 67. Furthermore, frame-dependent sub-codes may conveniently be generated by the sub-code unit 67 itself.

The MDA processor 65 is arranged to process a frame's worth of main data at a time together with the associated sub-codes. Thus during recording, the processor 65 receives a frame's worth of main data from the group processor 44 together with sub-codes from the unit 67. On receiving the main data the processor 65 interleaves the data, and calculates error correcting codes and parity values, before assembling the resultant data and sub-codes relating to the two tracks making up a frame. Before assembling the main data with the sub-codes, scrambling (randomizing) of the data may be effected to ensure a consistent RF envelope independent of the data contents of a track signal.

During playback, the processor 65 effects a reverse process on the contents of the same frame. Unscrambled error-corrected and de-interleaved main data are passed to the group processor 44 and sub-codes are separated off and distributed by the unit 67 to the processor 44 or system controller 43 as required.

The signal organizer 42 comprises a formatter/separator unit 53 which during recording (data writing) is arranged to assemble the track contents provided by the frame data processor 41, to form the signal including sync bytes to be recorded on each successive track. The necessary preamble patterns are also inserted into the track signals where necessary by the unit 53. Timing signals for coordinating the operation of the unit 53 with rotation of the heads $H_WA$, $H_WB$, are provided by a timing generator 54 fed with drum position signals output by a pulse generator 50 responsive to head drum rotation and located in the tape deck 11. The track signals output on line 55 from the unit 53 are passed alternately to head $H_RA$ and head $H_RB$ via a head switch 56, respective head drive amplifiers 57, and a rotary transformer (not shown) which is incorporated in the rotary head drum and which provides contact-less connection to the heads $H_RA$, $H_RB$, $H_WA$ and $H_WB$. The head switch 56 is operated by appropriate timed signals from the timing generator 54.

During playback (data reading) the track signals alternately generated by the heads $H_RA$ and $H_RB$ are fed via the rotary transformer, respective read amplifiers 59, a second head switch 60, and a clock recovery circuit 61, to the input of formatter/separator unit 53. The operation of the head switch 60 is controlled in the same manner as that of the head switch 56. The unit 53 now serves to generate signals indicating the timing of the predetermined regions (incorporating the sync bytes) in the track signals, to supply the timing signals to an automatic track following (ATF) circuit 49 in the tape deck 11, and to pass the track contents to the frame data processor 41. Clock signals are also passed to the processor 41 from the clock recovery circuit 61.

During reading, the system controller 43 also controls the timing of the read cycles to ensure that the read heads $H_RA$ and $H_RB$ do not start reading the tracks too early or too late. For this purpose the system controller 43 monitors various parameters including the average track height, that is the vertical separation of the start of the track from the lower edge of the tape. As the height increases or decreases, so the read heads $H_RA$ and $H_RB$ need to start reading later or earlier in the read cycle. The system controller 43 accordingly maintains a value representing the track height and uses this to control timing of the read cycle.

The tape deck 11 has four servos, namely a capstan servo 45 for controlling the rotation of the capstan 15, first and second reel servos 46, 47 for controlling rotation of the reels 13, 14 respectively, and a drum servo 48 for controlling the rotation of the head drum. Each servo includes a motor M and a rotation detector D both coupled to the element controlled by the servo. Associated with the reel servos 46, 47 is a detector 51 for sensing the ends of the tape: beginning of media (BOM) and end-of media (EOM); this detector 51 may be based for example on motor current sensing, as the motor current of whichever reel is being driven to wind in tape (dependent on the direction of tape travel) will increase significantly upon stalling of the motor at BOM/EOM.

The operation of the tape deck 11 is controlled by a deck controller 52 which is connected to the servos 45 to 48 and to the BOM/EOM detector 51. The controller 52 is operable to cause the servos to advance the tape, (either at normal speed or at high speed) through any required distance. This control is effected either by energizing the servos for a time interval appropriate to the tape speed set, or by feedback of tape displacement information from one or more of the rotation detectors D associated with the servos, by extracting logical position information from the sub-codes.

The deck controller 52 is itself governed by control signals issued by the system controller 43. The deck controller 52 is arranged to output to the controller 43 signals indicative of BOM and EOM being reached.

The system controller 43 serves both to manage high-level interaction between the computer and storage apparatus and to co-ordinate the functioning of the other units of the storage apparatus in carrying out the basic operations of Load-Record-Search-Playback-Unload requested by the computer. In this latter respect, the controller 43 serves to co-ordinate the operation of the deck 11 with the data processing portion of the apparatus.

In controlling the tape deck 11, the system controller can request the deck controller 52 to move the tape at the normal read/write speed (Normal) or to move the tape forwards or backwards at high speed, that is Fast Forward (F.FWD) or Fast Rewind (F.RWD).

Figure 2:
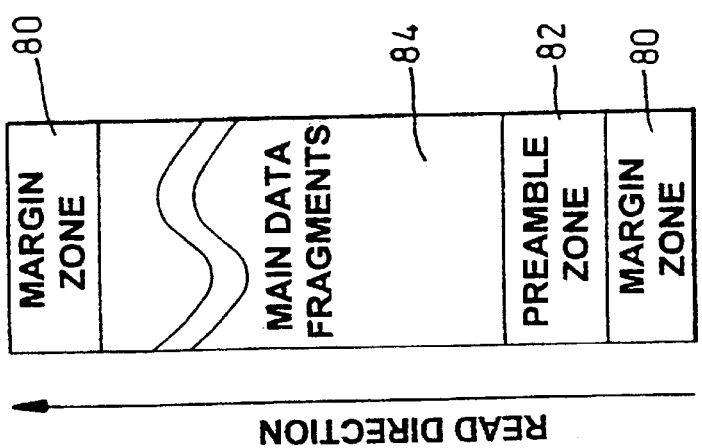
FIG. 2 is a block diagram representing the structure of a data track recorded on tape.

Having described the apparatus in detail, the structure of the data and in particular the sub-codes will now be described, with particular reference to DDS 3, although this is for illustrative purposes only as the invention is not limited to DDS systems. In the DDS 3 scheme, data to be recorded is assembled into basic groups of 384 296 bytes. As noted above, each group is divided into 22 frames (plus an optional 23rd frame if third level error correction C3 is used), each frame being written onto tape in the form of two adjacent tracks of opposite azimuth. Referring to FIG. 2, each track consists of two margin zones 80, a preamble zone 82, and a main data zone 84 comprising a series of 96 Main Data Fragments.

Figure 3:
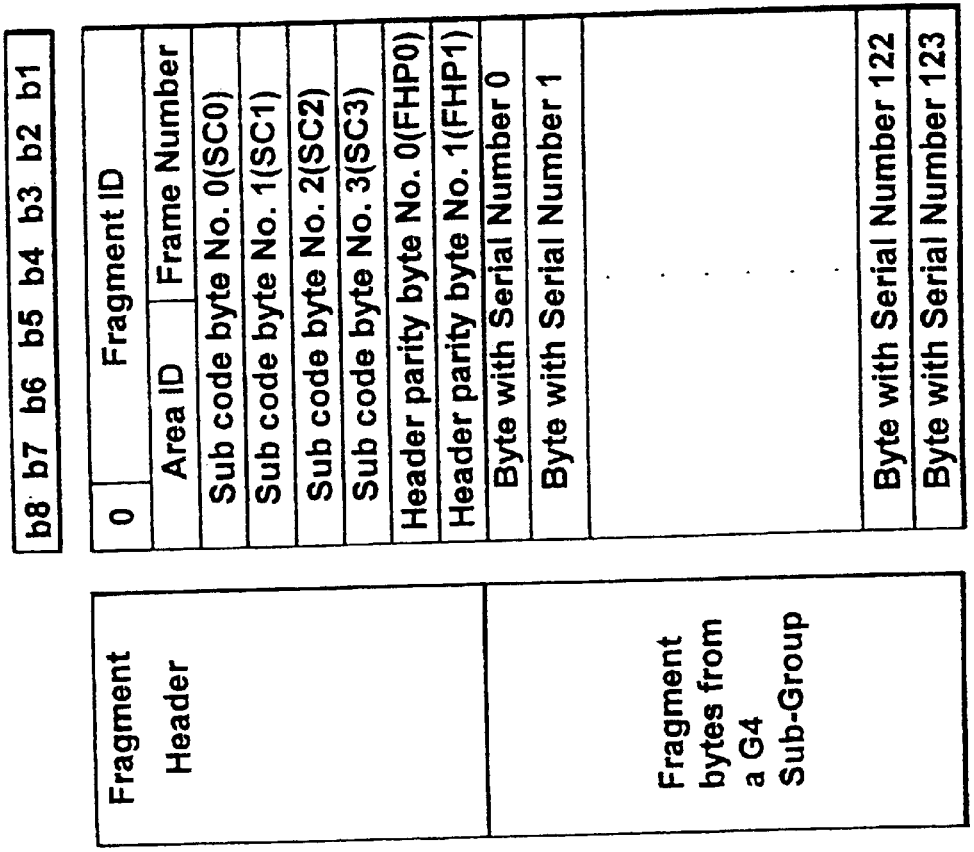
FIG. 3 is a diagram representing a Main Data Fragment.

The structure of a Main Data Fragment is shown in FIG. 3. From this it will be seen that each Main Data Fragment has a fragment header of eight bytes followed by 124 data bytes. Of the header bytes, four bytes identified SC0 to SC3 contain one pack item of sub-code information. Sub-code information is embedded along each track within the fragment header. The sub-code information specifies information such as the running number of the group, the number of separators written since the beginning of the tape, the number of records written since the beginning of the tape, information about the track contents and information about the history of the tape. The sub-code information is arranged as 4-byte pack items and, in DDS3, there are 16 different pack items and 96 Main Data Fragments per track and so, if all 16 pack items were repeated in a track, each track would contain 6 of any particular pack item. However, depending on the nature of the recording process in some instances only the first 8 pack items are included and so these would be repeated 12 times in a particular track.

In the present embodiment, use is made of pack item No. 4 (which in DDS 3 is allocated to the Absolute Frame Number), and pack item No.7 (which in DDS 3 is set to all zeros and has no set function). The Absolute Frame Number is a running number identifying the current frame, starting with 1 for the first frame after the logical beginning of tape. Given the typical pitch of the tracks making up the frame on the tape and the maximum length of the tape, the four bytes available allow a number ($2^{32}-1$) high enough to ensure that the absolute frame number on the tape is unique and not repeated.

The system controller 43 operates during an append operation in which data is appended to data already on tape to read the previously recorded data to determine the Absolute Frame Number of the last frame of the previously recorded data. This information is required, inter alia to ensure that the seamless or non-seamless appending rules of the ECMA standard are obeyed in generating the Absolute Frame Number of the first appended data frame.

In this embodiment, the Absolute Frame Number of the first appended frame is stored in pack item No. 7 of subsequent Main Data Fragments in all appended data.

Referring to FIG. 1, when the apparatus is recording appended data, the system controller 43 determines the Absolute Frame Number of the first frame of the appended group and supplies this to the frame data processor 41 to store it in the sub-code unit 67 so that the unit 67 sets the bytes of pack item No. 7 to specify in binary the Absolute Frame Number of the most recent appended frame up to and including the current frame. If there have been no appended frames up to an including the current frame, the sub-code unit 67 sets the bytes to the Absolute Frame Number corresponding to the first data frame, which in DDS3 is 151 decimal.

Accordingly, the AFN append point code is stored in all subsequent fames and therefore allows the system controller 43 quickly to determine where the last append point was, and to control the capstan servo 45, the reel servos 46, 47 and the drum servo 48 to position the heads HA and HB adjacent the append point of the tape. The sub-codes, including the AFN Append point code, can be read either at normal read speed or at fast read speed.

This operation is repeated for successive append points such that the immediately previous append point can be readily determined at any point on the tape.

When the apparatus is reading recorded data, the frame data processor 41 strips out the sub-codes which are processed by the sub-code unit 67 which makes pack items Nos 4 and 7 available to the system controller 43, so that the system controller is able to distinguish whether data is appended data and, if so to identify precisely the AFN append point. Thus, knowing the Absolute Frame Number of a particular frame, and the Append point code, the system controller 43 can determine by how many frames the mechanism needs to move the tape to reach the append point.

On the read cycle, as noted above, the system controller adjusts the timing of the cycle on the basis of the average track height. If data is written onto the first part of a tape using one machine and then, during a subsequent groups operation (on either the same or a different machine) data records are appended to those already on tape, the average track height for the earlier groups may well differ substantially from those required for the later record. When conventional tape storage and retrieval devices read across the interface between original and appended data, a substantial change in average track height will normally mean that the machine is unable to read data after the append point and will need to recalibrate by undergoing a calibration routine over the first appended group. The present embodiment identifies precisely the location of the first frame of the first appended group to enable such calibration to take place.

Figure 4:
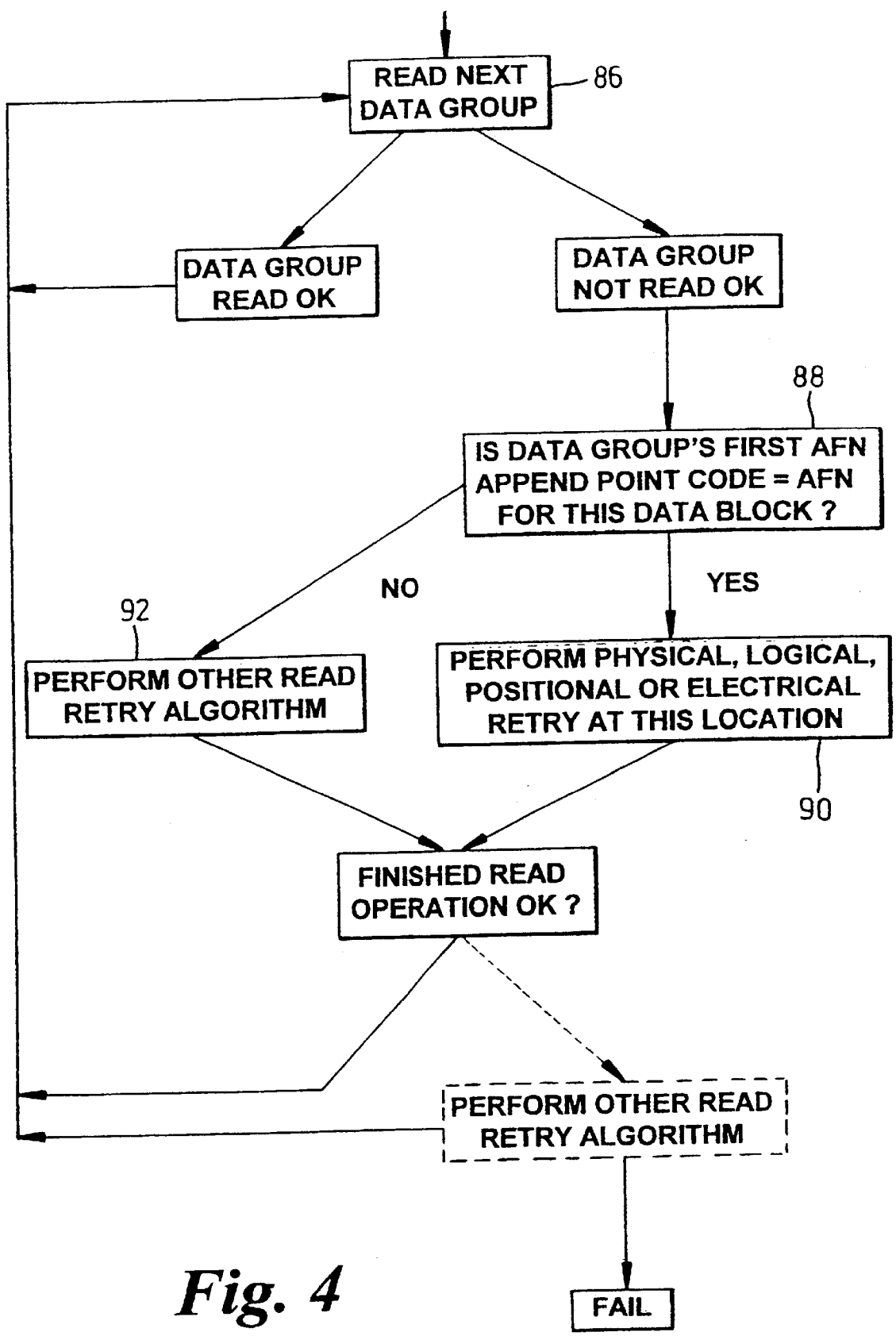
FIG. 4 is a block diagram of a read cycle routine.

The system controller 43 then performs an algorithm as set out in FIG. 4. Thus the 22/23 frames making up a group are read and the ECC correction codes employed to determine at 86 whether the data group has been read successfully. If the data group is read successfully then the process repeats. If the data group is not read successfully, then the system controller 43 examines the data group at 88 to see whether the Absolute Frame Number of the first frame in the group is the same as the append point AFN marker. If they are the same, this confirms that the data group is the first group of an appended data record. Thereupon the system controller 43 initiates a recalibration routine in which the tape is reversed to the append point and the track height recalculated over the first group and a read retry is carried out at 90. If the read retry is successful then the algorithm repeats to retrieve the next data group and so on. If however the read retry is unsuccessful then either an alternative read retry algorithm may be employed or the read operation is flagged as a failure. If the system controller determines at 88 that the data failure has not occurred at an append point, it may initiate an alternative read retry algorithm at 92.

Accordingly, the system described above allows a unique and unambiguous identification of the location of the append point (i.e. the interface between a previous data record and the appended data record). As discussed above, this can be used to allow the system controller precisely to position the tape adjacent the read/write drum so that the read heads read the first track of an appended data group. The insertion of the append point AFN marker in the first data block and in all subsequent data blocks within the appended data group and in all data blocks of subsequent data groups up to the next appended group provides many important benefits in addition to precise location of the append point. For example, on a fast read, where the tape passes at high speed past the read/write drum such that the read heads sample only a portion of the track, the append point AFN marker of successive fragments may be identified from the sub-code information. In this way the system controller 43 can clearly identify the previous append point locations on tape, which can be used to aid tracking calibration, data integrity confirmation and track positioning.

The system controller 43 can also implement a routine to distinguish whether data is "old" data. By "old" data is meant data remaining from a previous write operation and which in some circumstances may be incorrectly taken to be from the latter part of the most recent write operation. This can happen for example when the machine is powercycled, where a false hybrid record may result made up of fresh data for the first part up to when there was no power, and the remnant of the overwritten or "old" data for the second part. In this routine, the system controller monitors the append point codes as the data is read and flags an "old" data warning if the append point code decreases in value at any point. Although this will not flag all occurrences of old data, it does provide a reliable and rapid indicator, and may be used in conjunction with other conventional methods which utilise sub-code stored information to identify old data.

What is claimed is:

1. A method of storing data on a storage medium which comprises:

assembling said data into one or more groups each comprising one or more data blocks;

determining whether said one or more groups of data blocks are to overwrite, or to be appended to, previously written data on said medium;

including in at least some of any overwriting or appended data blocks of said groups a block order code indicating the order of said data block relative to the other data blocks on said storage medium;

incorporating in the or each group of overwriting or appended data blocks an append point code identifying the block order code of the first overwriting or appended data block; and storing said one or more groups on said storage medium.

2. A method of storing data according to claim 1, wherein a block order code is included in all said data blocks.

3. A method of storing data according to claim 1 wherein said data is written by relative movement of a write head and the storage medium, said method further including using the determination of the location of the boundary between the previously written data and the overwriting or appended data, to position a selected head physically adjacent said boundary.

4. Apparatus for storing a stream of data on a storage medium, which comprises:

an assembler for assembling said data into one or more groups each comprising one or more data blocks for being written onto said storage medium;

an appendency determiner for determining whether said data is to be overwrite, or to be appended to data, previously written on said medium;

a block ordering device for including in at least some of those data blocks comprising overwriting or appended data a block order code indicating the order of said data block relative to the other data blocks on said storage medium;

an append point incorporator for incorporating in the or each group of appended blocks an append point code identifying the block order code of the first overwriting or appended data block;

data device for writing said data blocks in series on said storage medium, and an append point determiner operable on reading overwriting or appended data to determine the location of the boundary between the overwriting or appended data and previously written data by reference to the append point code from one of said groups of overwriting or appended data blocks.

5. Apparatus for reading a stream of data from a storage medium on which is stored one or more earlier groups of one or more data blocks, and at least one overwriting or appended group of one or more data blocks, wherein at least some of the data blocks of said at least one overwriting or appended group each include a block order code identifying the order of said data block relative to the other data blocks on the storage medium, and each of said overwriting or appended groups including an append point code identifying the block order code of the first overwriting or appended data block;

said apparatus including a data reader for reading said overwriting or appended data blocks from said storage medium, and a processor for extracting the respective append point code from an overwriting or appended group, to determine the location of the boundary between the previously written data and the appended data.

6. Apparatus according to claim 5 wherein said data reader comprises a read head relatively movable with respect to said storage medium, and said apparatus further includes a storage medium drive responsive to said processor to locate said read head adjacent said boundary.

7. Apparatus according to claim 5, including a calibration circuit for calibrating the signal received by said data reader, said calibration circuit being responsive to determination of the boundary identified by said processor to initiate or invoke a fresh calibration routine.

8. A method for storing in accordance with claim 1, which further comprises reading said data, monitoring the append point codes of successive data groups and generating an old data alert if the append point code in a group indicates an append point which precedes that indicated by the append point of a preceding data group.

9. The method of claim 1 further including subsequently determining the location of the boundary between previously written data and the overwriting or appended data.

10. The method of claim 9 wherein the location is determined by extracting the append point code from one or more groups of said overwriting or appended data blocks.

11. Apparatus for storing data on a storage medium, the apparatus comprising a processor arrangement for:
(1) assembling said data into one or more groups each comprising one or more data blocks;
(2) determining whether said one or more groups of data blocks are to overwrite, or to be appended to, previously written data on said medium;
(3) including in at least some of any overwriting or appended data blocks of said groups a block order code indicating the order of said data block relative to the other data blocks on said storage medium;
(4) incorporating in the or each group of overwriting or appended data blocks an append point code identifying the block order code of the first overwriting or appended data block; and
(5) storing said one or more groups on said storage medium.

12. The apparatus of claim 11 wherein the processor arrangement is arranged for subsequently determining the location of the boundary between previously written data and the overwriting or appended data.

13. The apparatus of claim 12 wherein the processor arrangement is arranged for subsequently determining the location by extracting the append point code from one or more groups of said overwriting or appended data blocks.

14. A memory of a computer arrangement, the memory being arranged for causing the computer arrangement to:
(1) assemble data into one or more groups each comprising one or more data blocks;
(2) determine whether said one or more groups of data blocks are to overwrite, or to be appended to, previously written data on said medium;
(3) include in at least some of any overwriting or appended data blocks of said groups a block order code indicating the order of said data block relative to the other data blocks on said storage medium;
(4) incorporate in the or each group of overwriting or appended data blocks an append point code identifying the block order code of the first overwriting or appended data block; and
(5) store said one or more groups on said storage medium.

15. The memory of claim 14 wherein the memory is arranged for causing the computer arrangement to determine the location of the boundary between previously written data and the overwriting or appended data.

16. The memory of claim 15 wherein the memory is arranged for causing the computer arrangement to perform the determination by causing the computer arrangement to extract the append point code from one or more groups of said overwriting or appended data blocks.

* * * * *